3,385,839
CATION-ACTIVE COPOLYMERS OF HYDROXY-ALKYL AND PRIMARY AMINO-ALKYL ACRYLATES AND METHACRYLATES
Hans Ludwig Honig, Leverkusen, Guenter Kolb, Cologne-Stammheim, and Werner Theuer, Leverkusen, Germany, assignors to Farbenfabriken Bayer Aktiengesellschaft, Leverkusen, Germany, a German corporation
No Drawing. Filed Feb. 18, 1964, Ser. No. 345,571
Claims priority, application Germany, Feb. 18, 1963, F 39,043
8 Claims. (Cl. 260—80.73)

This invention relates to new copolymers of hydrophilic and at the same time cation-active character as well as a process for making such copolymers.

It is known to produce homopolymers and copolymers of hydroxyalkyl esters of acrylic and methacrylic acids with acrylonitrile, styrene or alkyl esters of acrylic and methacrylic acids. Because of their hydrophilic character, these copolymers have valuable properties for many applications. For example, German Auslegeschrift 1,113,090 describes water-soluble copolymers of diol monoesters of acrylic or methacrylic acid, which contain at least 50 percent of acrylic acid and which are suitable as thickening agents for emulsions and pigment suspensions, as suspension agents and coating compositions. Such polymers are not, however, suitable where it is necessary to apply polymer coatings and impregnations in highly diluted form, particularly onto materials of the cellulose type. In addition, the presence of carboxyl groups in the polymer is often not desired, for example, when cation-active polymeric substances are simultaneously used; in such case a polymer is formed which is ionically cross-linked by salt formation and is insoluble in water.

It has now been found, that these as well as other disadvantages can be avoided, and the aforementioned requirements satisfied by the use of the copolymers hereinafter described.

It has been found that the copolymers of the present invention can be obtained by polymerizing, with free radical-forming catalysts.

(a) 1–99 percent by weight of a monomer of the general formula

I 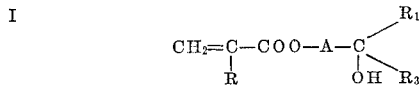

in which R, $R_1$ and $R_2$ each represent hydrogen atoms or methyl groups and A represents an optionally substituted alkylene group, advantageously a straight-chain or branched divalent aliphatic hydrocarbon radical with 1–6 carbon atoms, a

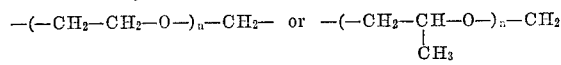

wherein $n$ is 1–20

(b) Together with 99–1 percent by weight of a monomer of the general formula

II 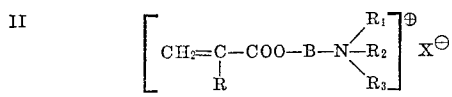

in which R represents a hydrogen atom or a methyl group, $R_1$, $R_2$ and $R_3$ represents a hydrogen atom, an alkyl group, an aralkyl group or an hydroxyalkyl group, advantageously an alkyl group with 1–4 or a hydroxy alkyl group with 10–20 carbon atoms; B represents an optionally substituted alkylene group with at least 2 carbon atoms, advantageously a straight-chain or branched divalent aliphatic hydrocarbon radical with 2 to 6 carbon atoms and $X^\ominus$ represents a negative ion capable of salt formation with the amine nitrogen optionally together with (c) 0–80 percent by weight (balance) of other monomers which do not have a cross-linking action during polymerization, i.e. a monomer containing at least one terminal $CH_2{=}C{<}$ —group such as monovinyl or monovinylidene compounds or conjugated aliphatic diolefines or their mixtures.

According to a preferred embodiment of this invention, the aforementioned monomers are applied, respectively to the copolymers containing the copolymerized (a) monomers mentioned in a range of from 5–85 percent by weight, the (b) monomers mentioned in a range of from 95–15 percent by weight and the balance consisting of (c) non-cross linking. All percentages given are by weight and calculated on the total amount of copolymer.

The hydroxyester monomers according to Formula I and within the scope of the present process include hydroxyalkyl esters of acrylic and methacrylic acid such as 2-hydroxyethyl acrylate and methacrylate, 2-hydroxypropyl acrylate and methacrylate, 3-hydroxypropyl acrylate and methacrylate and 4-hydroxybutyl methacrylate, the inventive process, however, is not in any way limited to these examples.

The following are examples of monomers of the aminoalkyl ester type according to Formula II, salts of aminoalkyl esters of acrylic and methacrylic acid, such as 2-aminoethyl methacrylate hydrochloride, 2-methylaminoethyl acrylate hydrosulphate, 2-dimethylaminoethyl methacrylate hydrochloride, 3-dimethylaminopropyl acrylate hydroacetate, 2-trimethylammoniumethyl methacrylate methosulphate, dimethylbutylammoniumethyl methacrylate methosulphate, dimethylcetylammoniumethyl acrylate or methacrylate chloride.

As is apparent, any arbitrary anions $X^\ominus$ can be considered as negative salt-forming atom groupings, provided they are capable of forming a salt with the amine nitrogen of the polymerisable aminoalkyl esters, for example amines of inorganic or organic monovalent or polyvalent acids, for example, a formate, acetate, oxalate, tartrate, chloride, bromide, sulphate, phosphate, nitrate, methosulphate and others.

The following are examples of copolymerisable monomers not having a cross-linking character:

(a) Acrylic and methacrylic acids, their esters, amides and nitriles, for example methyl methacrylate, ethyl methacrylate, butyl acrylate, acrylonitrile, acrylic and methacrylic acid amides, etc., (b) Vinyl esters of inorganic or organic acids such as vinyl acetate, vinyl propionate, chlorovinyl acetate and vinyl chloride.

(c) Aromatic vinyl compounds, such as styrene, vinyl toluene and α-methyl styrene, as well as vinyl heterocyclic compounds, such as 2-vinyl pyrrolidone and 2-vinyl pyridine, (d) Vinylidene compounds, more especially vinylidene chloride, (e) Conjugated diolefines, more especially of aliphatic nature, as for example butadiene, isoprene and 2-chlorobutadiene, (f) α-monoolefines and their substituent products, such as ethylene and propylene.

The preferred monomer types of this group, i.e. of monomers without capacity of cross-linking, are the lower alkyl acrylates (containing 1–6 C-atoms in the ester grouping) and acrylic acid amide.

Where monomers containing acid groups are concurrently used, they are expediently used in subordinate quantities.

In view of the known sometimes quite considerable difficulties connected with the satisfactory copolymerisation of salt-like compounds, it was very surprising that the hydroxyalkyl esters (I) and the salts of the aminoalkyl esters (II) can be copolymerised with one another in practically any ratio and that the copolymers obtained contain the introduced monomers in the ratio of the introduced monomer quantities.

By this means, it has become possible, depending on cation-active copolymers to obtain a product having a more or less strongly pronounced hydrophilic character. A strong hydrophilic character is for example obtained when the aminoalkyl ester component II is contained in the copolymer in quantities from 30 to 95%, whereas the copolymer has a less hydrophilic character when the proportion of this component is less than 30%. If small quantities of acrylic or methacrylic acids are used, then where only subordinate quantities of comonomer (III) are employed, hydrophilic copolymers which simultaneously have a very strongly pronounced cation-active character are obtained. Depending on the choice of the substituents $R_1$, $R_2$ and $R_3$ on the nitrogen of the aminoalkyl ester, these copolymers can be very broadly adapted to the actual purposes of use.

According to a preferred embodiment, water-soluble cation-active polymers are obtained which contain at least 15% (based on total monomers) of salts of the amino-alkyl esters of acrylic or methacrylic acid, as well as hydroxyalkyl esters of acrylic or methacrylic acids. On the other hand, it is possible to produce water-soluble copolymers with lower cation activity if the hydroxyalkyl ester of acrylic or methacrylic acid are copolymerised with water-soluble copolymerisable monomers and less than 15% of salts of the aminoesters of acrylic or methacrylic acid. Such polymers are of great interest, inter alia in the manufacture of paper.

The copolymerisation of the monomers can, in principle, be carried out by all known copolymerisation processes, i.e., depending upon the nature of the monomers used, in substance, in solution, in emulsion or in suspension. According to a preferred form, the copolymerisation takes place in aqueous solution or emulsion. Depending on the reaction medium, the polymerisation catalysts can be water-soluble, and more especially inorganic, peroxidic compounds such as persulphates, hydrogen peroxide or percarbonates, or monomer-soluble, and more especially organic, peroxidic compounds, e.g. acyl peroxides such as benzoyl peroxide, alkyl peroxides such as tertiary butyl hydroperoxide and cumyl hydroperoxide or dialkyl peroxides such as di-tert.-butyl peroxide, but, more especially, Redox systems which contain the aforementioned peroxidic compounds and, on the other hand, reducing agents which are based on acids of sulphur with the sulphur in a low valency state such as pyrosulphite, bisulphite, sulphoxylates or alkanolamines. On the other hand, it is equally well possible to use azo compounds of the type of azodiisobutyronitrile or azodicarboxylic acid esters, which have a tendency to radical decomposition.

These initiators are employed in the quantities which are known to be used, i.e. from 0.5 to 5%, based on the total monomers.

In order to influence the molecular weight, conventional regulators, such as long-chain mercaptans, nitro compounds or organic halogen compounds, can be used in the quantities normal for this purpose.

The copolymerisation can per se be carried out at temperatures within the usual range for such monomer types, i.e. usually at temperatures from 0 to 100° C., it being necessary for this temperature to be corrected in individual cases, according to the activation systems which are used.

It is possible to effect the copolymerisation in the form of a graft polymerisation, and in principle each of the three components can serve as grafting component or on the other hand as grafting substrate. All usual processing modifications, such as partial preliminary polymerisation of one component, staggered addition or continuous polymerisation processes are possible.

In the case of emulsion polymerisation, it is possible to use anionic, cationic or non-ionic emulsifiers, emulsions which are particularly stable to electrolyte being produced in known manner with non-ionic emulsifiers. For emulsions with a very fine particle size, very high bonding strength and taking capacity on cellulose materials, cation-active emulsifiers such as dodecylamine hydrochloride or cetylamine hydrochloride can advantageously be used.

The aqueous solutions of the copolymers according to the invention can be prepared either in a dilute form or in an extremely high concentration, as is necessary for certain technical purposes. In order to control the viscosity of the solutions according to the invention, the usual thickening agents, such as polyvinyl alcohol, gelatin, tragacanth or the methyl ethers of cellulose, can of course be used.

The copolymers can for example, be used as sheet formers, e.g. for the production of coatings, impregnations or adhesive unions, for the surface sizing of paper, as sedimentation auxiliaries, retention agents, antistatic agents, as textile or especially as dyeing auxiliaries, for fixing predominantly acid dyestuffs, in pigment printing, as fungicides, bactericides and disinfectants, the copolymers having the particular advantage of a comparatively low phytotoxicity.

Copolymers of the hydroxyalkyl esters of acrylic and methacrylic acids, with salts of $\beta$-aminoethyl acrylate or methacrylate and water-soluble copolymerisable monomers such as acrylamide, methacrylamide, acrylonitrile and others have proved to be particularly suitable as a cation-active copolymer for improving cellulose materials. Apart from their excellent water-solubility, these copolymers have the capacity of still taking quantitatively on cellulose materials from extremely high dilute forms, this being an urgent technical requirement, for example, for use in the paper industry.

They combine outstanding sedimentation effect and excellent retention of fillers, pigments and the like. In addition, the last-mentioned copolymers, when used as retention agents, have the advantage of a good compatibility with anion-active, optical brighteners.

The parts given in the following examples are parts by weight, unless otherwise indicated.

EXAMPLE 1

A mixture of 50 parts of 2-aminoethyl methacrylate hydrochloride, 75 parts of 2-hydroxypropyl methacrylate, 0.1 part of sodium formaldehyde sulphoxylate, 0.01 part of ferrous sulphate heptahydrate and 375 parts of water is treated with 0.5 part of cumene hydroperoxide while stirring in a nitrogen atmosphere at 20° C. The temperature rises spontaneously within 20 minutes to 40° C. and the clear solution becomes increasingly more viscous. After 5 hours, the reaction had ended. In order to determine the conversion, a sample is stirred with 10 times the quantity of acetone; the precipitated polymer is separated from the liquid and dried. The yield is quantitative. According to the analysis values, the polymer contains the monomers in the proportions in which they were introduced. The product has an excellent efficacy as filler retention agent in the manufacture of paper. If, for example, an amount of from 0.005 up to 0.1 percent by weight calculated on paper mass is mixed with the aqueous paper pulp one may observe a quick and quantitative precipitation of fillers on the paper-fibres.

EXAMPLE 2

A solution of 80 parts of 2-aminoethyl methacrylate hydrochloride and 20 parts of 2-hydroxyethyl methacrylate in 300 parts of water is stirred for 15 hours in a nitrogen atmosphere, after adding 0.1 part of potassium peroxydisulphate, at 30° C. A viscous polymer solution is formed and the yield is quantitative. Woven Dralon fabrics finished with the product show a distinctly lowered electrical surface resistance.

EXAMPLE 3

70 parts of 2-aminoethyl methacrylate hydrochloride and 30 parts of 2-hydroxypropyl methacrylate are dissolved at 50° C. in 350 parts of acetone, the air is displaced with nitrogen and 0.5 part of azodiisobutyronitrile is added to the stirred solution. After a few minutes, the solution becomes cloudy and precipitation of the copolymer, which is insoluble in acetone, begins. After 5 hours, reaction is complete. The precipitated colourless polymer powder is suction-filtered, washed with acetone and dried at 40° C. in vacuo. It is soluble in water.

EXAMPLE 4

0.3 part of sodium pyrosulphite is added to a mixture of 400 parts of water, 3 parts of oleyl alcohol polyglycol ether, 60 parts of butyl acrylate, 20 parts of 2-hydroxypropyl methacrylate and 20 parts of 2-aminoethyl methacrylate hydrochloride, the air is displaced with nitrogen, the mixture is heated to 50° C. and, after adding 0.6 part of potassium peroxydisulphate, stirred for 18 hours at 50° C. A very fluid, very stable polymer emulsion is formed. The polymer precipitated by pouring the emulsion into 10% sodium hydroxide solution.

EXAMPLE 5

50 parts of 2-dimethylaminoethyl methacrylate hydrochloride and 75 parts of 2-hydroxypropyl methacrylate are dissolved in 375 parts of water and the mixture, after adding 0.1 part of sodium formaldehyde sulphoxylate, 0.01 part of ferrous sulphate heptahydrate and 0.3 part of cumene hydroperoxide, is stirred at 20° C. in a stream of nitrogen. The temperature rises spontaneously to 35° C. A highly viscous polymer solution is formed, which can be diluted with water in any proportion.

EXAMPLE 6

0.2 part of sodium pyrosulphite and 0.6 part of potassium peroxydisulphate are added to 40 parts of acrylamide, 40 parts of 2-aminoethyl methacrylate hydrochloride and 20 parts of 2-oxypropyl methacrylate in 300 parts of water, while stirring in a nitrogen atmosphere at 17° C. The temperature rises spontaneously within a few minutes to 60° C. and then slowly falls again. A viscous polymer solution is formed. The yield, determined by precipitation with acetone, is quantitative.

EXAMPLE 7

0.5 part of potassium peroxydisulphate is added to a solution of 20 parts of 2-hydroxyethyl acrylate and 80 parts of the quaternary salt of 2-dimethylaminoethyl methacrylate and dimethylsulphate in 700 parts of water and is then stirred for 10 hours at 20° C. in a stream of nitrogen.

A viscous polymer solution is formed, which is suitable for the fixing of acid dyestuffs. The product is also effective as a disinfectant.

EXAMPLE 8

Highly viscous copolymer solutions are obtained by polymerizing in a manner as described in Example 1, respectively 6, the following monomer compositions:

|  | (a) | (b) | (c) | (d) |
|---|---|---|---|---|
| 2-oxypropylmethacrylate | 25 | 25 | 30 | 35 |
| Hydrochloride of 2-aminoethyl methacrylate | 5 | 10 | 10 | 10 |
| Acrylamide | 70 | 65 | 60 | 55 |

A copolymer solution containing 0.01 part by weight of a copolymer of one of the Examples (a), (b), (c) or (d) are added to a paper pulp prior to breast box, said paper pulp consisting of 70 parts by weight of bleached sulphite cellulose, 30 parts by weight of bleached mechanical wood pulp, 25 parts by weight of chinese clay, 2 parts by weight of rosin size, 4 parts by weight of aluminium sulphate, 10,000 parts by weight of water.

The ash content of a so obtained paper is substantially higher than the ash content of a paper of the same composition but prepared without applying the above retention agents. Depending on the machines used in sheet formation, the ash content may increase from 11.0 percent to 13.8 percent by weight.

What we claim is:

1. A water-soluble, hydrophilic cation-active polymeric material comprising a copolymer of (a) 5–85 percent by weight of 2-hydroxyalkylester of acrylic acid, the alkyl group in said hydroxyalkylester containing 1–6 carbon atoms, (b) 95–15 percent by weight of 2-aminoalkyl acrylate, the alkyl group of said amino alkyl acrylate containing 2–6 carbon atoms and (c) the balance consisting of a member selected from the group consisting of lower alkyl acrylate and acrylic acid amide.

2. A process for the production of hydrophilic, cation-active polymeric materials which comprises copolymerizing with an active amount of a free radical forming catalyst, (a) 1–99 percent by weight of a monomer of the formula $$CH_2=C-COO-A-C\underset{OH}{\overset{R_1}{\underset{|}{<}}} R_2$$
$$\phantom{CH_2=C}|\phantom{-COO-A-C}$$
$$\phantom{CH_2=}R$$

wherein R, $R_1$ and $R_2$ are members selected from the group consisting of hydrogen and methyl; A is a member selected from the group consisting of a bivalent aliphatic hydrocarbon radical having 1–6 carbon atoms, $-(-CH_2-CH_2-O-)_n-CH_2-$, and $$-(-CH_2-CH-O-)_n-CH_2-$$
$$\phantom{-(-CH_2-}|$$
$$\phantom{-(-CH_2}CH_3$$

and wherein $n$ is a whole number of 1–20;

(b) 99–1 percent by weight of a monomer of the formula $$\left[CH_2=C-COO-B-\overset{R_1}{\underset{R_3}{\overset{|}{N}}}-R_2\right]^{\oplus} X^{\ominus}$$

wherein R is a member selected from the group consisting of hydrogen and methyl; $R_1$, $R_2$ and $R_3$ are hydrogen; B is a bivalent aliphatic hydrocarbon radical containing at least 2 carbon atoms; and $X^{\ominus}$ is a group which is capable of salt-formation with amino-nitrogen; the balance consisting of (c) 0–80 percent by weight of a monomer containing at least one terminal $$CH_2=C-$$
$$\phantom{CH_2=}|$$

group, said monomer lacking cross-linking capacity during polymerization, and effecting the copolymerization reaction at a temperature of about 0–100° C.

3. A process of claim 2 which comprises copolymerizing (a) 5–85 percent by weight of a monomer of the formula $$CH_2=C-COO-A-\underset{OH}{\overset{R_1}{\underset{|}{C}}}-R_2$$
$$\phantom{CH_2=}|$$
$$\phantom{CH_2}R$$

wherein R, $R_1$ and $R_2$ are members selected from the group consisting of hydrogen and methyl; and A is a member selected from the group consisting of a bivalent aliphatic hydrocarbon radical having from 1–6 carbon atoms, $-(-CH_2-CH_2-O-)_n-CH_2-$ and $$-(-CH_2-CH-O-)_n-CH_2-$$
$$\phantom{-(-CH_2-}|$$
$$\phantom{-(-CH_2}CH_3$$

wherein $n$ indicates a whole number of 1–20;

(b) 95–15 percent by weight of a monomer of the formula

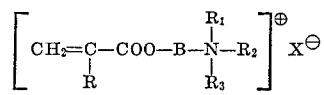

wherein R is a member selected from the group consisting of hydrogen and methyl; $R_1$, $R_2$ and $R_3$ are hydrogen; B is a bivalent aliphatic hydrocarbon radical containing at least 2 carbon atoms; and wherein $X^\ominus$ represents a group which is capable of salt-formation with amino-nitrogen; and (c) the balance consisting of another monomer containing at least one terminal

group, said monomer lacking cross-linking capacity during polymerization.

4. A process as claimed in claim 3 which comprises applying as monomer 5–85% of a 2-hydroxyalkylester of acrylic acid.

5. A process as claimed in claim 3 which comprises applying as monomer according to Formula (b) a 2-aminoalkyl acrylate.

6. A hydrophilic cation-active polymeric material comprising a copolymer of (a) 1–99 percent by weight of a monomer of the formula

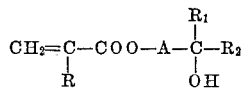

wherein R, $R_1$ and $R_2$ are members selected from the group consisting of hydrogen and methyl; A is a member selected from the group consisting of a bivalent aliphatic hydrocarbon radical having 1–6 carbon atoms, —($-CH_2-CH_2-O-$)$_n$—$CH_2-$ and

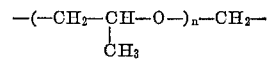

wherein $n$ is a whole number of 1–20;

(b) 99–1 percent by weight of a monomer of the formula

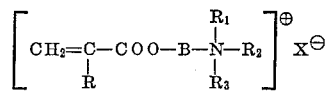

wherein R is a member selected from the group consisting of hydrogen and methyl; $R_1$, $R_2$ and $R_3$ are hydrogen; B is a bivalent aliphatic hydrocarbon containing 2–6 carbon atoms; $X^\ominus$ represents a group capable of salt-formation with amino-nitrogen; and the balance consisting of (c) 0–80 percent by weight of a monomer containing at least one terminal

group and lacking cross-linking capacity during polymerization.

7. A water-soluble hydrophilic cation-active polymeric material comprising a copolymer of (a) 5–85 percent by weight of a monomer of the formula

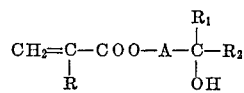

wherein R, $R_1$ and $R_2$ represent members selected from the group consisting of hydrogen and methyl; A is a member selected from the group consisting of a bivalent aliphatic hydrocarbon radical having 1–6 carbon atoms, —($-CH_2-CH_2-O-$)$_n$—$CH_2-$ and

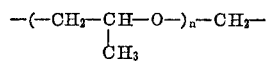

wherein $n$ is a whole number of 1–20;

(b) 95–15 percent by weight of a monomer of the formula

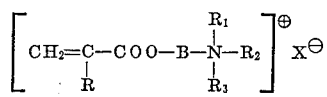

wherein R is a member selected from the group consisting of hydrogen and methyl; $R_1$, $R_2$ and $R_3$ are hydrogen; wherein B represents a bivalent aliphatic hydrocarbon radical containing at least 2 carbon atoms; and wherein $X^\ominus$ represents a group which is capable of salt-formation with amino-nitrogen; and the balance consisting of (c) another monomer containing at least one terminal

group lacking cross-linking capacity during polymerization.

8. A water-soluble, hydrophilic cation-active polymeric material comprising a copolymer of (a) 5–85 percent by weight of 2-hydroxy alkyl ester of acrylic or methacrylic acid, the alkyl group in said hydroxyalkyl ester containing 1–6 carbon atoms;

(b) 95–15 percent by weight of 2-aminoalkyl acrylate or methacrylate, the alkyl group of said amino alkyl acrylate containing 2–6 carbon atoms, and (c) the balance consisting of a member selected from the group containing at least one terminal

group lacking crosslinking capacity.

References Cited

UNITED STATES PATENTS

| | | | |
|---|---|---|---|
| 2,828,220 | 3/1958 | McWherter et al. | 260—29.6 |
| 2,831,781 | 4/1958 | Upson et al. | 260—86.1 |
| 3,227,672 | 1/1966 | Fertig et al. | 260—86.1 |

JOSEPH L. SCHOFER, *Primary Examiner.*

W. HOOVER, S. M. LEVIN, *Assistant Examiners.*